United States Patent [19]

Cuscurida et al.

[11] 4,101,462
[45] Jul. 18, 1978

[54] URETHANE CATALYST

[75] Inventors: Michael Cuscurida; George P. Speranza, both of Austin, Tex.

[73] Assignee: Texaco Development Corp., New York, N.Y.

[21] Appl. No.: 785,388

[22] Filed: Apr. 7, 1977

[51] Int. Cl.² .................. C08G 18/18; C08G 18/20
[52] U.S. Cl. ............................. 521/115; 521/118; 528/49; 528/53
[58] Field of Search .............. 260/2.5 AC, 77.5 AC, 260/75 NC

[56] References Cited

U.S. PATENT DOCUMENTS

| 3,215,652 | 11/1965 | Kaplan | 260/2.5 AC |
| 3,221,016 | 11/1965 | Currier | 260/2.5 AC |
| 3,622,542 | 11/1971 | Klouman | 260/2.5 AC |
| 4,026,840 | 5/1977 | Bechara | 260/2.5 AC |
| 4,049,931 | 9/1977 | Sandner | 260/2.5 AC |

Primary Examiner—C. Warren Ivy
Attorney, Agent, or Firm—Carl G. Ries; Thomas H. Whaley; James L. Bailey

[57] ABSTRACT

The method of preparing polyurethanes using a catalytic amount of a reaction product of N,N-disubstituted-aminoalkyleneamine with an alkylene oxide is disclosed. These catalysts produce polyurethane products which have no amine odor even immediately after formation of the urethane.

7 Claims, No Drawings

URETHANE CATALYST

BACKGROUND OF THE INVENTION

1. Field of the Invention

This invention pertains to amine catalyst for the urethane reaction.

2. Description of the Prior Art

It is known to prepare foamed polyurethanes by the reaction of a polyisocyanate, a polyhydroxyl compound and a blowing agent, such as a halogenated hydrocarbon, water, or both, in the presence of a catalyst. The catalyst is employed to promote at least two and sometimes three major reactions that must proceed simultaneously and competitively at balanced rates during the process in order to provide a good polyurethane foam. One reaction is a chain-extending isocyanate-hydroxyl reaction by which a hydroxyl-containing molecule is reacted with an isocyanate-containing molecule to form a urethane. This increases the viscosity of the mixture and provides a polyurethane-containing secondary nitrogen atoms in the urethane groups. A second reaction is a cross-linking isocyanate-urethane reaction by which an isocyanate-containing molecule reacts with a urethane group containing a secondary nitrogen atom. The third reaction is an isocyanate-water reaction by which an isocyanate-terminated molecule is extended and by which carbon dioxide is generated to blow or assist in blowing the foam. The third reaction is not essential if an extraneous blowing agent, such as a halogenated normally liquid hydrocarbon or carbon dioxide, for example, is employed, but is essential if all, or even a part, of the gas for foam generation is to be generated by this in situ reaction.

The reactions must proceed simultaneously at optimum balanced rates relative to each other in order to obtain a good foam structure. If carbon dioxide evolution is too rapid in comparison with chain extension, the foam will collapse. If chain extension is too rapid in comparison with carbon dioxide evolution, foam rise will be restricted, resulting in a high-density foam with a high percentage of poorly defined cells. The foam will not be stable in the absence of adequate cross-linking.

It has long been known that tertiary amines, such as trimethylamine, triethylamine, etc., are effective for catalyzing the cross-linking reaction. Some of the tertiary amines are effective for catalyzing the water-isocyanate reaction for carbon dioxide evolution. However, tertiary amines are only partially effective as catalysts for the first chain-extension reaction. To overcome this problem, the so-called "pre polymer" technique was developed wherein a hydroxy-containing polyol component is partially reacted with the isocyanate component in order to obtain a liquid pre polymer containing free isocyanate groups. This prepolymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine, such as triethylenediamine, is employed in conjunction with an organic tin compound. Triethylenediamine is particularly active for promoting the water-isocyanate reaction, and the tin compound is particularly active, in synergistic combination with the triethylenediamine, for promoting the chain-extension reaction. However, even here, the results obtained leave much to be desired. Triethylenediamine is a solid and must be dissolved before use to avoid processing difficulties. Also, many prior art amine catalysts, even dimethylaminoethanol, tend to impart a strong amine odor to flexible polyurethane foams, particularly immediately after foam formation.

In U.S. Pat. No. 3,786,030 the use of dialkylaminoalkylurethanes as latent catalysts for the trimerization of polyisocyanate terminated prepolymers is disclosed. The urethane is formed by the reaction of an organic isocyanate with N,N-dialkylaminoalkanols.

While N,N-dialkylaminoalkanols, such as dimethylaminoethanol, are known to be useful as catalyst of urethane formation, they suffer in that foam produced, particularly newly made flexible foam, has a strong amine odor. It is desirable to react the components of urethane formation in the presence of a catalyst which produces negligible, or no, odor but yet has sufficient catalytic activity to provide fast cream times and long rise times while producing urethane foams having good physical properties.

Surprisingly, N,N-dimethylaminopropylamine, when propoxylated with two or three mols propylene oxide, is just such a catalyst for polyurethane formation even though having an amine content substantially less than that of other amine catalyst. While N-substituted diisopropanolamines, generally preferred, have been used, after reaction with sebacic acid, to form polyurethane elastomers, the significance of the use of the compounds of this invention as catalysts for the production of urethanes, particularly polyurethane foams requiring a balance of reactions, as previously mentioned, has been totally unrecognized. (See "Synthesis of N-Substituted Diisopropanolamines, Their Sebacate Polyesters and Polyurethane Elastomers", Jean L. Boivin, Can. J. Chem. 36-1405 (1958).)

SUMMARY OF THE INVENTION

The invention is a new amine catalyst for the urethane reaction, particularly useful for flexible and rigid polyurethane foam production, represented by the formula:

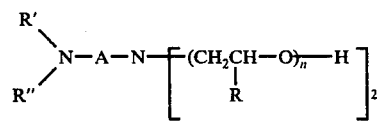

where R is independently hydrogen or a methyl radical provided the terminal hydroxyl group is secondary; R' and R" are, independently, a lower alkyl radical or, taken together with the nitrogen to which they are attached, form a morpholine ring; A is a straight or branched chain alkylene radical having two to four carbon atoms; and $n$ has an average value of from one to about three. The use of this catalyst, in the presence of a blowing agent, in the production of polyurethane foams results in foams that are substantially free of amine odor. The activity of the catalyst is surprising since the amine content of the compound, expressed in meq/gm, is considerably less than that of other useful amine catalysts.

The catalyst is a mobile liquid at room temperature and performs satisfactorily in making both polyester and polyether polyurethane foams.

DESCRIPTION OF THE PREFERRED EMBODIMENT

The catalyst useful in the practice of this invention is, in its broadest sense, described by the formula set forth above.

Preferably, the catalyst is the two or three mol propylene oxide adduct of dimethylaminopropylamine or, stated another way, R' and R" are each —CH$_3$, A is —CH$_2$CH$_2$CH$_2$— and R is —CH$_3$, with $n$ having an average value of 1 to 1.5.

The catalyst composition is prepared by alkoxylating, using known procedures, the base primary amine with from two to about six mols of an alkylene oxide, either ethylene and propylene oxide, provided, however, when ethylene oxide is reacted with the amine, propylene oxide is also reacted so that the terminal hydroxyl group is attached to a secondary carbon atom formed by the reaction of propylene oxide. Therefore, R is —CH$_3$, methyl, on the carbon atom adjacent to the terminal hydroxyl group. The preferred embodiment of this invention is to react sufficient propylene oxide to produce compounds such that both the labile hydrogen atoms on the nitrogen are reacted resulting in having from 1 to about 1.5 mols of propylene oxide per added chain. The reaction can conveniently be performed at a temperature of from about 100° to about 150° C. and a pressure of from about 25 to about 100 psig.

With respect to the base amine to which the alkylene oxide is added, the nitrogen atoms are separated by the hydrocarbon moiety, A, which is either an alkylene group having two to four carbon atoms such that the nitrogen atoms are attached on adjacent carbon atoms or polymethylene groups having from 2 to 4 carbon atoms. As shown by the foregoing structural representation, one of the nitrogen atoms of the base compound is a tertiary nitrogen atom to which are attached lower alkyl groups, i.e., alkyl groups having from one to about four carbon atoms, represented by R' and R". This nitrogen atom can also be included in a heterocyclic ring to form a morpholino compound. Preferred examples of the N,N-disubstitutedaminoalkyleneamines are, for example, N,N-dimethylaminopropylamine (DMAPA), morpholinopropylamine, morpholinoethylamine, N,N-dibutylpropylamine, N-methyl-,N-butylaminopropylamine, N,N-dimethylamino-(2-ethyl-)ethylamine, and the like, which are well known compounds prepared by methods known to those of ordinary skill in the art.

The dialkylaminoalkyleneamines useful as catalysts in the practice of this invention are prepared by reacting a molar excess of the alkylene oxide in order to produce the catalyst material. Generally, the molar ratio will be from about 2:1 to about 10:1 to obtain the degree of alkoxylation desired. When small amounts of alkylene oxide are used, i.e., where the ratio is from 2:1 to about 4:1, the reaction proceeds without the necessity of an added alkoxylation catalyst, such as sodium hydroxide and the like.

In order to form polyurethane foams, several ingredients are essential: first, an organic isocyanate. The isocyanate may be difunctional such as toluene diisocyanate or the polyfunctional polyaryl isocyanates. The polyaryl polyisocyanates are produced by the phosgenation of the reaction product of aniline and formaldehyde. Such reactions are well known and are described in U.S. Pat. Nos. 2,683,730 and 3,277,173, 3,344,162 and 3,362,797, for example. The polyaryl isocyanates thus formed have functionalities greater than two which can be varied up to the higher functionality materials. In practice, however, functionalities greater than four are attained only with difficulty. However, for the purpose of practicing this invention, materials with a functionality as high as five may be used. It is preferred that the functionality be from two to about four.

The hydroxyl-containing polyol component which reacts with the isocyanate may suitably be a hydroxyl-containing polyester or polyhydric polyether having a hydroxyl number ranging from about 700 to about 25, or lower. When it is desired to provide a flexible foam, the hydroxyl number is preferably in the range from about 25 to about 60. For rigid foams, the hydroxyl number is preferably in the range from about 350 to 700. Semi-rigid foams of a desired flexibility are provided when the hydroxyl number is intermediate to the ranges just given.

When the polyhydroxyl-containing material is a polyester, it is preferable to use, as the polyester, a resin having a relatively high hydroxyl number and a relatively low acid number made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids, a phthalic acid, terephthalic acid, isophthalic acid, or the like, is non ethylenic and non reactive. Thus, aromatic acids may be employed for the acid component. Aliphatic acids, such as succinic acid, adipic acid, sebacic acid, azelaic acid, etc., may be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerythritol, trimethylolethane, trimethylolpropane, mannitol, sorbitol, polyglucosides, etc. Mixtures of two or more of the above-identified alcohols may be employed if desired. When a flexible urethane foam is desired, the polyol should preferably have an average functionality of from about two to about four and a molecular weight of from about 2000 to about 4000. For rigid foams, the functionality of the polyol component is preferably three or more (e.g., five to eight).

When the hydroxyl-containing component is a polyhydric polyether, polyether polyol, for use in flexible polyurethane foam, the polyol may be an alkylene oxide condensate of a polyhydric alcohol with a functionality of from about two to about four. The alkylene oxide may suitably be ethylene oxide, propylene oxide, or 1,2-butylene oxide, 1,4-butylene oxide or a blocked or heteric mixture of some or all of these. The polyol will suitably have a molecular weight within the range of from about 2000 to about 7000. For flexible polyether polyurethane foams, the alkylene oxide is preferably propylene oxide or a mixture of propylene oxide and ethylene oxide and the molecular weight is preferably within the range of about 2000 to 4000.

For rigid polyether polyurethane foams, the polyol should hve a functionally of four or more (e.g., five to seven) and a molecular weight of from about 300 to about 1000. Polyols for rigid polyether polyurethane foams may be made in various ways including the addition of an alkylene oxide as above to a polyhydric alcohol with a functionality of from four to seven. These polyols may also be, for example, Mannich condensation products of a phenol, an alkanolamine, and formaldehyde, which Mannich condensation product is then reacted with an alkylene oxide. See U.S. Pat. No. 3,297,597.

The amount of organic polyhydroxyl polyol compound to be used relative to the isocyanate compound in both polyester and polyether foams normally should be such that the isocyanato groups are present in at least an equivalent amount, and preferably, in slight excess, compared with the free hydroxyl groups. In reacting the polymeric polyhydroxy compound with the organic polyisocyanate, this ratio, called the isocyanate (NCO) index is between 0.8 and 1.5. Preferably, the ingredients will be proportioned so as to provide from about 0.95 to about 1.5 mol equivalents of isocyanato groups per mol equivalent to hydroxyl groups, and most preferably, from about 0.95 to about 1.15.

It is within the scope of the present invention to utilize an extraneously added inert blowing agent such as a gas or gas-producing material. For example, halogenated low-boiling hydrocarbons, such as trichloromonofluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See, for example, U.S. Pat. No. 3,072,082.

When water is used, the amount of water, based on the hydroxyl compound, is suitably within the range of about 0.05 to about 0.25 mol per mol equivalent of hydroxyl compound.

The catalyst is present in a catalytically effective amount. The catalyst to be used in the preparation of rigid polyether polyurethane foams in accordance with the present invention, based on the combined weight of the hydroxyl-containing compound and polyisocyanate, is from about 0.02 to about 0.2 weight percent of the tertiary amines of this invention either alone or in a mixture with one or more other tertiary amines.

The catalyst to be used in the preparation of flexible polyether polyurethane foams in accordance with the present invention, based on the combined weight of the hydroxy-containing compound and polyisocyanate, is from about 0.02 to about 0.2 weight percent of the tertiary amine of this invention either alone or in a mixture with one or more other tertiary amines and preferably with from about 0.1 to about 0.4 weight percent of an organic tin compound. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from one to eight carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof may be used.

The catalyst to be used in the preparation of polyester flexible foams in accordance with the present invention, based on the combined weight of the hydroxyl containing compound and polyisocyanate, is from about 0.5 to about 2.5% of the tertiary amine of this invention either alone or in a mixture with the other tertiary amines, such as trialkylamines (e.g., trimethylamine, triethylamine), heterocyclic amines, such as N-alkylmorpholines (e.g., N-alkylmorpholines, N-methylmorpholine, N-ethylmorpholine, etc.), 1,4-dimethylpiperazine, triethylenediamine, etc., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula:

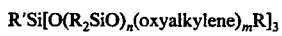

wherein R is an alkyl group containing from one to four carbon atoms; $n$ is an integer of four to eight; $m$ is an integer of 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams," Mar. 22, 1960.

When it is desired to prepare rigid foams, the "one-shot" method or the so-called "quasi-prepolymer method" is employed, wherein the hydroxyl-containing component preferably contains from about four to seven reactive hydroxyl groups, on the average, per molecule.

In accordance with the "quasi-prepolymer method," a portion of the hydroxyl-containing component is reacted in the absence of a catalyst with the polyisocyanate component in proportions so as to provide from about 20% to about 40% free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

While the amines of this invention have been reacted with an acid, sebacic acid, and then reacted, as a polyester, to form elastomers as described in the Boivin article, previously mentioned, the art has totally failed to recognize the important catalytic characteristics of the amines of this reaction, particularly in connection with the production of polyurethane foams. It is surprising that the catalytic activity of the amines of this invention is as great as that of other amines having a larger amine content such as N,N-dimethylaminoethanol, for example. Further, in comparison with such N,N-dimethylaminoethanol, the amines of this invention particularly N,N-dimethylaminopropylamine to which has been added two to three mols propylene oxide, shows the almost total absence of any amine odor, even immediately after preparation of the foam.

Further the amines of this invention are particularly useful to catalyze the reaction between aliphatic isocyanates such as methylene bridged cyclohexylisocyanates produced from the hydrogenation of the aforementioned polyaryl isocyanates to form then hard urethane coatings.

This invention will be illustrated further by the following specific examples, which are given by way of illustration and not as limitation upon the scope of this invention.

PREPARATION OF PROPYLENE OXIDE ADDUCT OF DIMETHYLPROPYLAMINE

EXAMPLE I

This example will illustrate the preparation of a propylene oxide adduct of dimethylaminopropylamine (DMAPA). No catalyst was employed. To a ten gallon stirred, pressure kettle, twenty pounds of N,N-dimethylaminopropylamine (DMAPA) (0.196 mols) was charged. The kettle was then purged with purified nitrogen and a total of 34.4 lb. propylene oxide (0.855 mols) was added at 110°–115° C to a maximum pressure of 60 psig. After digesting the reaction mixture for two hours, the kettle retained a pressure of 32 psig. After digestion, the reactor was vented and the product stripped with nitrogen to a minimum pressure at 110° C. Five pounds unreacted propylene oxide was recovered from the stripped product. The final product was a near colorless, mobile liquid with a light amine odor. It had the following properties:

| | |
|---|---|
| Total amine, meq/g | 7.3 |
| Water, wt.% | 0.08 |
| Hydroxyl No., mg KOH/g. | 481 |
| Viscosity, 25° C., c.s. | 75 |

EXAMPLE II

This example will further illustrate the preparation of another propylene oxide adduct of DMAPA, this time employing a one hour digestion period instead of the digestion period of two hours of Example I. To the 10-gallon kettle of Example I 12.26 lb. of DMAPA (0.1203 mols) was charged. The kettle was purged with purified nitrogen. No catalyst was added. Propylene oxide, 15 pounds (0.259 mols), was added at 120°–125° C. at 60 psig. After one hour of digestion at 125° C., the reactor was vented. The product was then stripped to a minimum pressure at 125° C., nitrogen-stripped for 1 hour, and finally polish filtered. The finished product was clear, colorless, mobile liquid with a moderate amine odor. It had the following properties:

| | |
|---|---|
| Total amine, meq/g. | 8.83 |
| Water, wt.% | 0.06 |
| Hydroxyl No., mg KOH/g. | 543 |
| Viscosity, 25° C., c.s. | 120 |

USE OF PROPYLENE OXIDE ADDUCT OF DMAPA AS A CATALYST FOR FLEXIBLE POLYETHER POLYURETHANE FOAM

EXAMPLE III

This example will illustrate the use of the propylene oxide adduct of DMAPA having an amine content of 7.3 meq/g and hydroxyl number 481 prepared in Example I in the preparation of flexible polyether polyurethane foam. It will further demonstrate the catalytic activity of this catalyst as compared with dimethylaminoethanol (DME) sold by the Jefferson Chemical Company under the trademark Thancat™ DME, which has an amine content of 11.2 meq/g. All of the reactants in the formulations given below, except the toluene diisocyanate, were stirred for 45 sec. using a Cowles-type stirrer operated at 4200 rpm. The isocyanate was then added and the reactants mixed for an additional 5–6 seconds. The foaming mixture was poured into boxes and allowed to rise to full height. The foam was cured for one hour at 100°–105° C. and then for several days before testing. Formulations, details of preparation, and foam properties are shown in Table I:

TABLE I

| | PO ADDUCT OF DMAPA | | | DME |
|---|---|---|---|---|
| FOAM | "A" | "B" | "C" | "D" |
| Formulation, parts by wt. | | | | |
| 3000 molecular weight propylene oxide adduct of glycerin | 100 | 100 | 100 | 100 |
| Water | 4.0 | 4.0 | 4.0 | 4.0 |
| Silicone Stabilizer | 1.0 | 1.0 | 1.0 | 1.0 |
| 50% stannous octoate in dioctyl phthalate[1] | 0.8 | 0.8 | 0.8 | 0.8 |
| Propoxylated DMAPA[2], OH 481 | 0.1 | 0.2 | 0.3 | — |
| Thancat DME[3] | — | — | — | 0.1 |
| Toluene diisocyanate | 49.4 | 49.4 | 49.4 | 49.4 |
| Isocyanate index | 1.05 | 1.05 | 1.05 | 1.05 |
| Details of preparation | | | | |
| Cream time, sec. | 12 | 10 | 10 | 10 |
| Rise time, sec. | 98 | 87 | 82 | 104 |
| Properties of Foam ASTM 1564–67T: | | | | |
| Density, pcf. | 1.72 | 1.77 | 1.64 | 1.86 |
| Tensile strength, psi. | 21.3 | 20.7 | 17.3 | 23.2 |
| Elongation, percent | 227 | 241 | 216 | 229 |
| Tear, pli | 3.6 | 2.74 | 3.0 | 3.2 |
| Compression set, percent | | | | |
| 50% | 7.6 | 8.4 | 5.2 | 5.2 |
| 90% | 16.6 | 17.8 | 15.0 | 10.7 |

[1]Metal and Thermit Co.
[2]Lot 4664-41
[3]Dimethylaminoethanol; Jefferson Chemical Co.

Foam using propylene oxide adduct of DMAPA catalyst were thus shown to be as active and to have competitively fast cream times and long use times as the dimethylaminoethanol (DME) catalyzed foam. Sections cut from freshly-made foams using the catalyst of this invention had no amine odor while a strong amine odor was detected from foam "D" using the DME.

EXAMPLE IV

This example will illustrate the use of the propylene oxide adduct of DMAPA having an amine content of 8.83 meq/g and hydroxy number of 543 prepared in Example II in the preparation of flexible polyetherpolyurethane foams, together with a comparison with another state-of-the-art amine catalyst for urethane, bis(-dimethylaminoethyl)ether (b-DMES), which has an amine equivalent of 12.5 meq/g. The foams were prepared substantially as described in Example III.

| | PO ADDUCT OF DMAPA | b-DMEE |
|---|---|---|
| Formulation, parts by wt. | | |
| 3000 m.w. propylene oxide adduct of glycerine | 100 | 100 |
| Water | 4.0 | 4.0 |
| Silicone Stabilizer | 1.0 | 1.0 |
| 50% stannous octoate[1] | 0.6 | 0.6 |
| Propoxylated DMAPA, OH# 543 | 0.1 | — |
| Bis(dimethylaminoethyl)ether | — | 0.1 |
| Toluene diisocyanate | 49.6 | 49.6 |
| Isocyanate Index | 1.05 | 1.05 |
| Reaction Properties | | |

-continued

|  | PO ADDUCT OF DMAPA | b-DMEE |
|---|---|---|
| Cream time, sec. | 11 | 11 |
| Rise time, sec. | 97 | 89 |
| Foam appearance | Excellent | Excellent |
| Amine Odor | None | Strong |

[1]Thermolit T-10 manufactured by Metal and Thermite Co

Again, it is shown that the catalytic activity of the propylene oxide adduct was equivalent to b-DMEE and resulted in a foam with no amine odor and excellent appearance.

USE OF PROPYLENE OXIDE ADDUCT OF DMAPA AS A CATALYST FOR RIGID POLYETHER POLYURETHANE FOAM

EXAMPLE V

This example illustrates the preparation of rigid polyether polyurethane foams using a propylene oxide adduct of DMAPA having a hydroxyl number of 543 and amine content of 8.83 meq/g, prepared in Example II, in comparison with dimethylaminoethanol (DME). The polyol employed was a propylene oxide adduct of sorbitol having a molecular weight of approximately 700. The foam was prepared in the manner similar to that shown in Example III.

The rigid foam prepared from the propoxylated DMAPA had properties superior to that of the DME foam, and a freshly cut sample had no detectable amine odor while a sample of the DME catalyzed foam had a definite amine odor.

| FOAM | PO ADDUCT OF DMAPA | | | DME | | |
|---|---|---|---|---|---|---|
| Formulation, parts by wt. | | | | | | |
| Polyol | 38.5 | | | 38.5 | | |
| DME | — | | | 0.7 | | |
| Propoxylated DMAPA | 0.7 | | | — | | |
| Silicone Stabilizer | 0.5 | | | 0.5 | | |
| Fluorocarbon R-11b | 13.3 | | | 13.3 | | |
| 2.7 functionality polymeric isocyanate | 47.0 | | | 47.0 | | |
| Isocyanate index | 1.05 | | | 1.05 | | |
| Reaction Properties and Details: | | | | | | |
| Mixing time, sec | 15 | | | 15 | | |
| Cream time, sec | 70 | | | 60 | | |
| Tack free time, sec | 330 | | | 330 | | |
| Rise time, sec | 390 | | | 360 | | |
| Initial surface friability | Very slight | | | Very slight | | |
| Foam appearance | Good | | | Good | | |
| Foam Properties | | | | | | |
| Density, pcf (ASTM D1622-63) | 1.89 | | | 1.84 | | |
| K-factor | 0.133 | | | 0.129 | | |
| Compressive strength, psi (ASTM 1621) | | | | | | |
| with rise | 30.95 | | | 30.6 | | |
| cross rise | 13.4 | | | 12.3 | | |
| Heat distortion temp., °C | 163 | | | 161 | | |
| Closed cells, % | 91.0 | | | 90.8 | | |
| Friability, % wt loss | 17.3 | | | 19.2 | | |
| Dimensional stability (ASTM D2126) | ΔV | ΔW | ΔL | ΔV | ΔW | ΔW |
| 158° F, 100% R.H., one week | +7.0 | −0.2 | +4.5 | +6.9 | −0.2 | +4.8 |
| 80° F, dry, one week | +2.4 | −0.4 | +1.7 | +2.9 | −0.9 | +2.0 |
| −20° F, dry, one week | −2.7 | +0.4 | −1.5 | −2.8 | +0.4 | −1.5 |

EXAMPLE VI

This example will illustrate the preparation of a two mole propylene oxide adduct of aminopropylmorpholine (APM). No catalyst was employed. To a five gallon stirred, pressure kettle, 7.5 pounds of aminopropylmorpholine were charged. The kettle was then purged with purified nitrogen and a total of 8.19 pounds of propylene oxide were added at 110°–115° C to a maximum pressure of 50 psig. After digesting the reaction mixture for two hours, the reactor was vented and the product stripped with nitrogen to a minimum pressure at 100°–110° C, then filtered. Unreacted propylene oxide (1.95 pounds) was recovered from the stripped product. The final product was a light yellow, viscous liquid with a light amine odor. It had the following properties:

| Total amine, meq/g | 7.55 |
|---|---|
| Water, wt.% | 0.02 |
| Hydroxyl No., mg KOH/g. | 455 |

EXAMPLE VII

This example will illustrate the use of the propylene oxide adduct of APM having an amine content of 7.55 meq/q and hydroxyl number 455 prepared in Example VI in the preparation of flexible polyether polyurethane foam. All of the reactants in the formulations given below, except the toluene diisocyanate, were stirred for 45 seconds using a Cowles-type stirrer operated at 4200 rpm. The isocyanate was then added and the reactants mixed for an additional 5–6 seconds. THe foaming mixture was poured into boxes and allowed to rise to full height. The foam was cured for 1 hour at 100°–105° C. and then for several days before testing. Formulations, details of preparation and foam properties are shown in the following table.

| | PO ADDUCT OF APM | |
|---|---|---|
| FOAM | "A" | "B" |
| Formulation, parts by wt. | | |
| 3000 molecular weight propylene oxide adduct of glycerin[1] | — | 100 |
| 3500 molecular weight mixed propylene oxide/ethylene oxide adduct of glycerin[2] | 100 | — |
| Water | 4.0 | 4.0 |
| Siclicone Stabilizer[3] | 1.0 | 1.0 |
| 50% stannous octoate in dioctyl phthalate[4] | 0.7 | 0.6 |
| Propoxylated APM (OH 455) | 0.1 | 0.1 |
| Toluene diisocyanate | 48.4 | 49.7 |
| Isocyanate index | 1.05 | 1.05 |
| Details of Preparation | | |
| Cream time, sec | 12 | 12 |
| Rise time, sec. | 113 | 110 |
| Post cure, °C, (hr.) | 100° (1.0) | 110° (1.0) |
| Properties of Foam ASTM 1564-67T | | |
| Density, pcf. | 1.7 | 1.7 |
| Tensile strength, psi | 17.9 | 20.5 |
| Elongation, percent | 178 | 192 |
| Tear, pli | 1.8 | 2.4 |
| Compression set, percent | | |
| 50% | 7.5 | 7.6 |
| 90% | 10.0 | 8.8 |
| Residual odor after cure | none | none |

[1]THANOL F-3000 polyol sold by Jefferson Chemical Co., Inc.
[2]THANOL F-3500 polyol sold by Jefferson Chemical Co., Inc.
[3]L-520 silicone sold by Union Carbide Chemical Co.
[4]Thermolit T-10 sold by Metal and Thermite Co.

We claim as our invention:

1. A method for producing a urethane which comprises:

reacting an organic isocyanate with an organic hydroxyl compound in the presence of a catalytic amount of an amine catalyst of the formula:

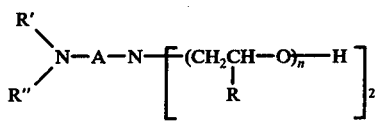

where R is independently hydrogen or a methyl radical provided the terminal hydroxyl group is secondary; R' and R" are, independently, lower alkyl radicals or, taken together with the nitrogen to which they are attached form a morpholine ring; A is a straight or branched chain alkylene radical having two to four carbon atoms; and $n$ has an average value of from one to about three;

said organic hydroxyl compound being either a polyhydric polyether or a polyester having terminal hydroxy groups, which polyesters are obtained from the reaction of a polycarboxylic acid with a polyhydric alcohol.

2. The method of claim 1 wherein the catalyst is a morpholino compound and wherein $n$ has a value of about 3.

3. The method of claim 1, wherein the catalyst is the reaction product of N,N-dimethylaminopropylamine and two to three mols propylene oxide.

4. A method for producing a polyurethane foam which comprises:

reacting, in the presence of a blowing agent, an organic polyisocyanate with an organic polyhydroxyl compound in the presence of a catalytic amount of an amine catalyst of the formula:

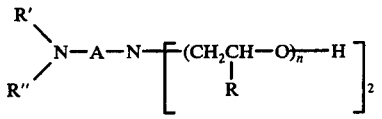

where R is independently hydrogen or a methyl radical provided the terminal hydroxyl group is secondary; R' and R" are, independently, lower alkyl radicals or, taken together with the nitrogen atom to which they are attached form a morpholine ring; A is a straight or branched chain alkylene radical having two to four carbon atoms; and $n$ has an average value of from one to about three;

said organic polyhydroxyl compound being either a polyhydric polyether or a polyester having terminal hydroxyl groups, which polyesters are obtained from the reaction of a polycarboxylic acid with a polyhydric alcohol.

5. The method of claim 4 for preparing a flexible polyether polyurethane foam which comprises:

reacting, in the presence of a blowing agent, an organic polyisocyanate with a polyhydric polyether having a molecular weight within the range of from about 2000 to about 7000 and a functionality of from 2 to about 4 in the presence of a catalytic amount of the reaction product of N,N-dimethylaminopropylamine and two to three mols propylene oxide.

6. The method of claim 4 for preparing a rigid polyether polyurethane foam which comprises:

reacting, in the presence of a blowing agent, an organic polyisocyanate with a polyhydric polyether having a functionality of from about three to about seven and a hydroxyl number within the range of about 300 to about 700 in the presence of a catalytic amount of the reaction product of N,N-dimethylaminopropylamine and two to three mols propylene oxide.

7. The method of claim 4 for preparing a flexible polyester polyurethane foam which comprises:

reacting, in the presence of a blowing agent, toluene diisocyanate with a hydroxyl-terminated condensation product of a polycarboxylic acid and a polyhydric alcohol in the presence of a catalytic amount of the reaction product of N,N-dimethylaminopropylamine and two to three mols propylene oxide, said toluene diisocyanate being employed in an amount sufficient to provide an isocyanate index of from 1.0 to about 1.5 and said condensation product having a functionality of about two to about four and a molecular weight of from about 2000 to about 4000.

* * * * *